Jan. 22, 1952     M. LEHMANN     2,582,999
INDUSTRIAL TRUCK Filed May 18, 1949     7 Sheets-Sheet 1

INVENTOR.
MAX LEHMANN
BY Geo. B. Pitts
ATTORNEY

Jan. 22, 1952 — M. LEHMANN — 2,582,999
INDUSTRIAL TRUCK

Filed May 18, 1949 — 7 Sheets-Sheet 3

INVENTOR.
MAX LEHMANN.
BY Geo. B. Pitts
ATTORNEY

Jan. 22, 1952     M. LEHMANN     2,582,999
INDUSTRIAL TRUCK Filed May 18, 1949     7 Sheets-Sheet 4

INVENTOR.
MAX LEHMANN
BY Geo. B. Pitts
ATTORNEY

Jan. 22, 1952   M. LEHMANN   2,582,999
INDUSTRIAL TRUCK
Filed May 18, 1949   7 Sheets-Sheet 5

INVENTOR.
MAX LEHMANN
BY Geo. B. Pitts
ATTORNEY

Jan. 22, 1952 — M. LEHMANN — 2,582,999
INDUSTRIAL TRUCK
Filed May 18, 1949 — 7 Sheets-Sheet 6

INVENTOR.
MAX LEHMANN.
BY Geo. B. Pitts
ATTORNEY

Jan. 22, 1952   M. LEHMANN   2,582,999
INDUSTRIAL TRUCK

Filed May 18, 1949   7 Sheets-Sheet 7

INVENTOR.
MAX LEHMANN.
BY
Geo. B. Pitts
ATTORNEY

Patented Jan. 22, 1952

2,582,999

UNITED STATES PATENT OFFICE 2,582,999

INDUSTRIAL TRUCK

Max Lehmann, East Cleveland, Ohio, assignor to
The Baker-Raulang Company, Cleveland, Ohio,
a corporation of Ohio Application May 18, 1949, Serial No. 93,985

19 Claims. (Cl. 187—9)

This invention relates to an industrial truck of the elevating type having vertical guides for the elevating member. In all trucks of this type, of which I have knowledge, the supports or guides for the elevating member, which supports the load carrier, extend upwardly varying heights, determined by specific conditions in which each truck is to be employed, whereby loads can be stacked or positioned on and removed from different levels. In some instances the truck frame carried a pair of guides the length of which determined the upward travel of the elevating member; in other instances extensible guides were provided to permit travel of the elevating member to higher levels. In these trucks, as the carrier is fixedly related to the elevating member, its limit of upward movement approximates the height or length of the guides or extension thereof for the elevating member.

One object of the invention is to provide in a vehicle of the type referred to an improved elevating member having thereon a vertically movable carrier adapted to be raised or lowered relative to the elevating member, whereby operations in handling loads to and from levels above the guides, or limit of movement of the elevating member upwardly, may be rapidly and easily carried out.

Another object of the invention is to provide an improved elevating truck wherein provision is made for moving the carrier upwardly and downwardly relative to the elevating member to raise loads to and from levels above the limit of upward travel of the elevating member, whereby the range of operations of the truck is materially increased.

Another object of the invention is to provide an improved truck of this type wherein the elevating member thereon is provided with a guide on which the load carrier is slidably mounted and means are provided for raising the carrier relative to the elevating member.

Another object of the invention is to provide an improved truck of this type wherein the elevating member thereon is provided with a guide on which the load carrier is slidably mounted and power operated to and from selected elevations on said guide.

Another object of the invention is to provide in a vehicle of the type referred to an improved mechanism for raising loads to and from varying heights and consisting of a load carrier, relatively slidable members between the carrier and frame of the vehicle and a fluid operated means for raising or lowering one member within a predetermined range of movement independently of the other member or raising and lowering both members successively.

Another object of the invention is to provide in a truck having a power operated elevating member, a carrier slidably mounted on the elevating member and fluid operated means supported on the elevating member and engaging the carrier for raising and lowering the latter on the elevating member.

Another object of the invention is to provide in a truck of the character referred to an improved elevating mechanism consisting of an elevating member having a load carrier slidably mounted thereon and main and auxiliary power operated elements on the elevating member for moving the carrier vertically relative to the elevating member.

Another object of the invention is to provide in an elevating type of truck, an improved load handling apparatus consisting of an elevating member or support movable upwardly and downwardly on guides mounted on the truck frame, a load carrier movable upwardly and downwardly on a guide mounted on the elevating member or support and fluid operated mechanisms are provided for raising the elevating member or support and carrier, the fluid operated mechanisms being controlled by one or more valves, whereby the carrier may be operated to and from selected levels to meet varying conditions and a wide range of operations of the truck are attained.

Another object of the invention is to provide in an industrial truck an improved load handling apparatus consisting of a support movable upwardly and downwardly on guides mounted on the truck frame, a load carrier movable upwardly and downwardly on a guide mounted on the support and fluid operated mechanisms connected to the support and carrier, respectively, and operable to move the support and/or carrier, whereby the latter may be adapted to different operating requirements and positioned at levels above the limit of movement of the support.

Other objects of the invention will be apparent to those skilled in the art to which my invention relates from the following description taken in connection with the accompanying drawings, wherein.

In the drawings (referring particularly to Figs. 1 to 15, inclusive), 1 indicates a frame supported on a front pair of wheels 2 and a rear pair of wheels 3. Either pair of wheels may be mounted for angular movement to effect steering of the truck by operation of a device, such as wheel 4, and either pair of wheels may be driven by suitable mechanism (not shown) having a power supply enclosed in a housing 5, which for illustrative purposes is mounted on the rear portion of the frame 1. The construction of the truck frame and the parts referred to form no part of the present invention and may therefore be of any desired construction and arrangement.

Figures 1, 2:
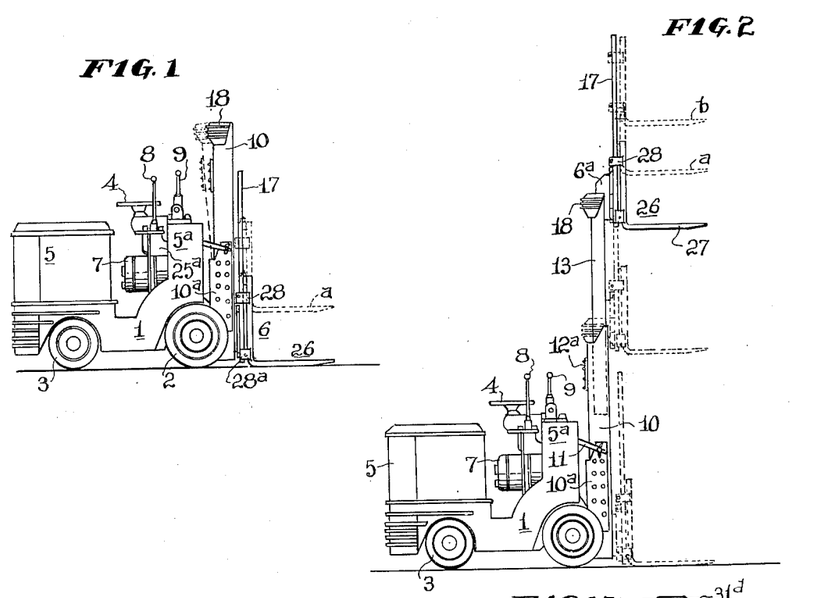
Fig. 1 is a side elevation of a truck embodying my invention.
Fig. 2 is a view similar to Fig. 1, but showing the carrier elevated and diagrammatically illustrating other positions thereof.

6 indicates as an entirety an elevating mechanism preferably suitably mounted on the frame 1 for tilting inwardly, as shown in dotted lines in Fig. 1. The mechanism 6 includes an elevating member or support and guides therefor (later referred to) mounted on the frame 1. In the form of construction shown in Figs. 1 to 15, the means for tilting the elevating mechanism 6 and for raising the elevating member may be of the electric or hydraulic type. Where this latter referred to type is employed, a motor 7 is used for operating a pump, and the control of the motor and flow of liquid from the pump is effected by suitable levers (only two of the levers designated 8 and 9 being shown).

The elevating mechanism 6 comprises suitable guide means (later referred to), an elevating member (indicated as an entirety at 6a) supported on and movable relative to the guide means and a carrier 26 mounted on the elevating member to slide upwardly to selected positions, whereby such mechanism provides a wide range of utility.

Referring to the elevating mechanism 6, 10 indicates a pair of spaced guide elements provided with reinforcing plates 10a, having inwardly extending portions which are suitably fulcrumed on the frame 1. Each plate 10a is pivotally connected to the outer end of a rod 11, the inner end of the rod carrying a piston reciprocatable in a cylinder (not shown). Fluid under pressure is supplied in a well known manner to the ends of the cylinders, whereby the elevating mechanism 6 may be tilted inwardly and moved outwardly to its normal or vertical position. The cylinders for the pistons on the rods 11 and other parts for the supply and flow of the fluid are mounted in a suitable housing 5a. The guide elements 10 are connected at their lower ends by a base 12 (see Figs. 5 and 6) and intermediate their upper and lower ends by a plate 12a. The guide elements 10 are channel shaped in cross section and, if desired, the elevating member 6a may be slidably mounted directly thereon, but to provide for a wider range of loading, unloading and stacking operations I mount a pair of guide members 13 for slidable or telescopic movement in the guide elements 10 and slidably support the elevating member 6a in the guides 13. In this arrangement the guide members 13 may be moved endwise of the guide elements 10 and the elevating member 6a moved longitudinally of the guide members 13 to the upper ends thereof and thus serve to operate the elevating member 6a to a level higher than would be otherwise permitted by the guide elements 10, as shown in Fig. 2.

The elevating member 6a comprises the following: 14, 14a, indicate upper and lower plates to which are connected inwardly extending supports 15. Each support 15 is provided with laterally extending upper and lower stud shafts carrying rollers 15a which roll on and are guided by the walls of the guide members 13 (see Figs. 4 and 7). 16, 16a, indicate upper and lower members removably inter-engaging the upper edge of the upper plate 14 and lower edge of the lower plate 14a, respectively. 17, 17, indicate auxiliary guide members each rigidly mounted on the adjacent members 16, 16a, and extending upwardly from the lower member 16a, for a purpose later referred to. As will be observed, the guide members 17, 17, are mounted on the elevating member 6a, so as to move upwardly and downwardly therewith and connected together at their lower ends by the plate 14a.

The upper ends of the guide members 13 are connected by a cross member 18 the lower edge of which is provided with inwardly extending lugs disposed in the path of movement of shoulders 19 (see Fig. 4) on the inner end walls of the roller supports 15, so that in the upward movement of the elevating member 6a the shoulders 19 engage the lugs on the cross member 18 and operate therethrough to move the guide members 13 upwardly, as shown in Figs. 2, 3, 5, 6 and 7.

The mechanism for raising the elevating member 6a may be of any desired type, but is shown as consisting of a cylinder 20 mounted on the base 12 midway the guide elements 10 and extending upwardly therefrom and enclosing a reciprocatable piston provided with a rod 20a. The upper end of the rod 20a is provided with a head 21 suitably supporting on its opposite ends shafts for sprockets 22, which are engaged by chains 22a. The inner ends of the chains 22a are connected to the upper ends of rods 23, the lower ends of which are suitably anchored to the base 12 (see Fig. 5). The outer ends of the chains 22a are secured to angles 24 mounted on the cross plate 14a (see Fig. 10). Fluid under pressure is supplied to the cylinder 20 through a pipe 25 leading from the pump, the supply of fluid being controlled by a valve diagrammatically shown at 25a, operated by the handle 8. By supplying fluid under pressure through the supply pipe 25 (see Fig. 6) to the lower end of the cylinder 20, the piston therein will be operated upwardly and thus endwise move the rod 20a. As the rod 20a carries with it the head 21 and sprockets, the upward movement of the latter will exert upward pull on the outer runs of the chains 22a to raise the elevating member 6a relative to the guides 10 and 13. If the supply of fluid under pressure to the cylinder 20 is continued, the shoulders 19 will engage the lugs on the cross member 18, the effect of which is to move the guide members 13 upwardly and the elevating member 6a to the upper ends thereof as shown in Figs. 2, 3, 5, 6, 7, 8, 13 and 14. It will therefore be noted that the elevating member 6a may be raised to a level approximating that of the upper ends of the guide members 13 when the latter are extended to the limit of their movement upwardly and to any selected level therebelow; by operating the valve 25a to direct the flow of the fluid from the cylinder 20 to a sump, following the raising of the elevating member 6a, the latter will gravitate downwardly.

Suitable devices (not shown) may be provided to stop the movement of the elevating member 6a or guide members 13 upwardly and downThe load carrier 26 is slidably mounted on the auxiliary guide members 17 and movable from end to end thereof. The carrier 26 consists of an outwardly projecting support 27 for a load having at its inner end upstanding members 27a, each provided with upper and lower shoes 28, 28a, slidably engaging the guides 17. By preference, the support 27 consists of a pair of forks each formed integrally with one of the upstanding members 27a, the members 27a being connected together by a bar 27b and an angle 27c. Each shoe consists of side plates welded at their outer ends to the opposite sides of the adjacent upstanding member 27a. The side plates of each upper shoe 28 support the opposite ends of a transverse shaft 28b on which a roller 28c is mounted and arranged to roll on the rear side of the adjacent guide 17, whereas the side plates of each lower shoe 28a support the opposite ends of a transverse shaft 28d on which a roller 28e is mounted and arranged to roll on the front side of the adjacent guide 17.

29 indicates fluid operated means for raising and lowering the carrier 26 on the guides 17 relative to the elevating member 6a. The raising and lowering means 29 consist of a source of fluid supply under pressure mounted on the frame 1, a power mechanism 30 interposed between the elevating member 6a and carrier 26 and connected by conduits with the source of fluid supply under pressure and a suitable valve mechanism (not shown) to control the flow of the fluid through the conduits. The fluid employed preferably consists of a suitable liquid, such as oil. Of the power mechanism 30, 31 indicates a main jack and 32 indicates an auxiliary jack. By preference I provide two auxiliary jacks 32. The main jack 31 consists of a vertically disposed cylinder 31a mounted at its lower end on the base member 17a midway the auxiliary guides 17. The cylinder 31a is provided with a piston 31b connected to a rod 31c (see Fig. 15). The outer end of the rod 31c is connected to a cross-head 33 rigidly secured to the cylinders 32a of the jacks 32. The outer end portion of the rod 31c is reduced to provide an annular shoulder to which the cross member 33 is secured by a nut 31d threaded on the rod 31c. The opposite end portions 33a of the cross-head 33 are detachably connected to its central portion, the opposed walls between these portions being shaped to rigidly engage the cylinders 32a when the end portions 33a are secured in position. In this arrangement, it will be observed that when the carrier 26 is disposed at the lower ends of the guides 17, the jacks 32 are spacedly disposed at opposite sides of and parallel to the jack 31 (see Figs. 1, 2, 3, 4, 5, 6 and 7). The cylinders 32a are provided with pistons connected to rods 32b which in turn are connected at their upper ends to the cross member 27c. The cylinders 31a, 32a, and pistons therein are substantially similar in construction, except that the connections for the fluid with the cylinder 31a are differently located as compared to similar connections for the cylinders 32a. The connections of the rods 32b with the cross member 27c are preferably substantially similar to the connection of the rod 31c to the cross-head 33.

The fluid system for the power mechanism 30 includes a suitable sump or reservoir and a motor driven pump. Where a hydraulically operated mechanism is employed for raising the elevating member 6a, one sump or reservoir, one pump and a motor (motor 7) may be employed for supplying fluid under pressure to both mechanisms. In the form of construction shown in Figs. 1 to 15, inclusive, one valve controls the supply of fluid under pressure to the cylinder 20 and a separate valve mechanism controls the supply of fluid under pressure through conduits (a) to the lower ends of the cylinders 31a, 32a, when the carrier 26 is to be raised and discharge of the fluid from the opposite ends of the cylinders for return to the reservoir and (b) to the upper ends of the cylinders 31a, 32a, when the carrier 26 is to be lowered and discharge of the fluid from the opposite ends of the cylinders for return to the reservoir. The valve mechanisms may be of conventional construction, for which reason they are not illustrated. In this arrangement of fluid pressure supply one conduit, indicated at 34, leads from the valve mechanism to a T-connection 34a from which lead a branch conduit 35 connected to the lower end of the cylinder 31a and a branch conduit 35a connected to the lower end of the adjacent cylinder 32a, the conduit 35a being connected by a branch conduit 35b to the lower end of the remote cylinder 32a. The other conduit, indicated at 36, leads from the valve mechanism to a union 36a, connected to the upper end of the cylinder 31a and connected to a branch conduit 36b to the upper end of the adjacent cylinder 32a, the conduit 36b being connected by a branch conduit 36c to the upper end of the remote cylinder 32a. It will be observed that the fluid system is initially filled with liquid. It will also be observed that the operation of the elevating member 6a to and from selected elevations is dependent on the supply of fluid pressure to the cylinder 20, so that the elevating member 6a and carrier 26 may be moved as a unit vertically independently of the position of the carrier 26 on the guides 17, whereas the carrier 26 may be moved upwardly and downwardly on the guides 17 independently of the position of the elevating member 6a by supply of fluid pressure to the jacks 31, 32; these operations being effected by the operation of separate valve mechanisms. By operating both valve mechanisms simultaneously, relative movement of the elevating member 6a and carrier 26 may be effected.

It will be understood that while the diameters of the cylinders 32a are the same, the total areas of the pistons therein differ from the area of the piston in the cylinder 31a. For example, the area of the piston in the cylinder 31a may be larger than the total area of the pistons in the cylinders 32a; in this arrangement, jack 31, upon opening of the valve in conduit 34, will be effective, through the cross head 33 and jacks 32, to raise the load carrier on the guides 17 a distance equal to the stroke of the piston in the cylinder 31a, as shown in dotted lines at a (Fig. 1). If the elevating member 6a is first raised (for example, to the limit of its movement, as shown in Fig. 2) and thereafter the jack 31 is operated as above set forth, the carrier 26 is raised to the position shown in dotted lines at a (Fig. 2). Upon movement of the carrier 26 as above set forth, if the valve is maintained in open position to continue the supply of fluid pressure through conduit 34 the supplied pressure will be effective on the pistons in the cylinders 32a to move the carrier to a higher level, such as shown in dotted lines at b (Fig. 2). On the other hand, as shown in the drawings, if the total area of the pistons in the cylinders 32 is greater than the area of the piston in the cylinder 31a, then the jacks 32 will be effective through the cross member 27c to raise the carrier a distance equal to the stroke of the pistons in the cylinders 32a; following such movement, if the valve is maintained open, the supplied fluid pressure will be effective on the piston in the cylinder 31a and through the cross head 33 and cylinders 32 raise the carrier 26 to a higher position equal to the stroke of the piston in the cylinder 31a.

Figures 3, 4, 23:
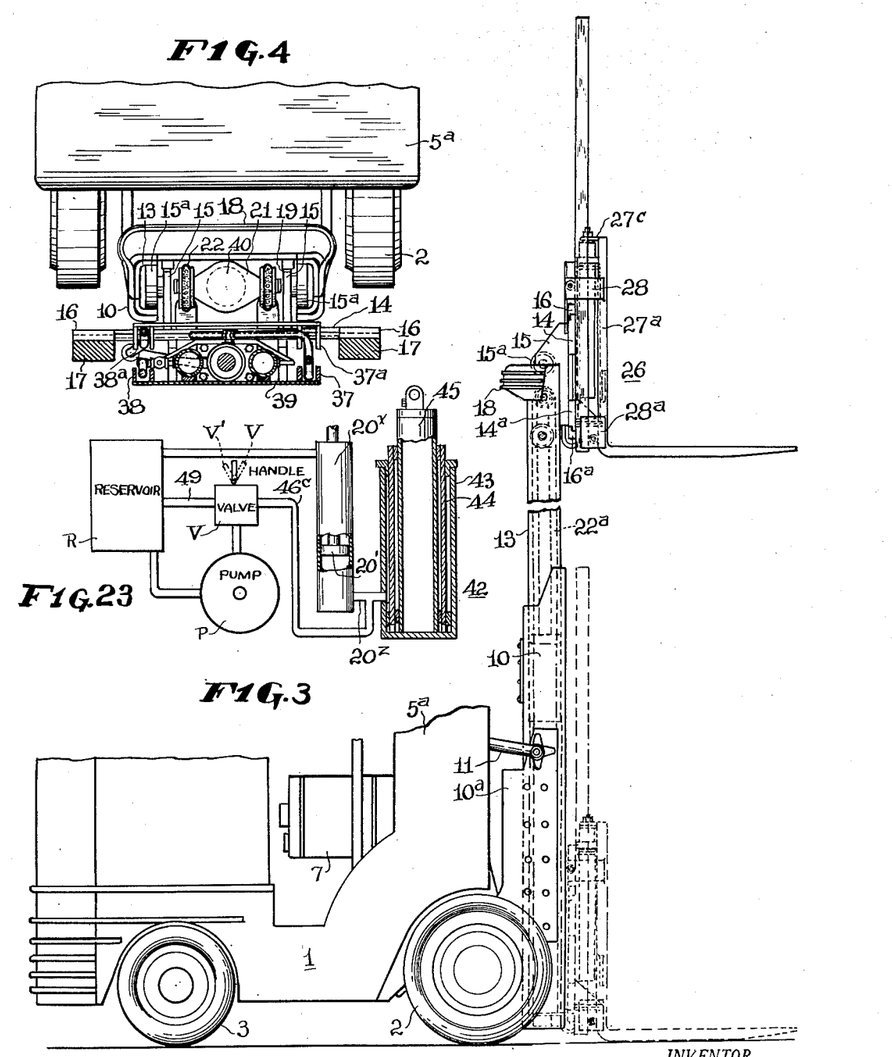
Fig. 3 is a fragmentary view of parts shown in Fig. 2, enlarged.
Fig. 4 is a section on the line 4—4 of Fig. 9 (somewhat enlarged).
Fig. 23 is a diagrammatic view.
Figures 5, 6, 7, 8:
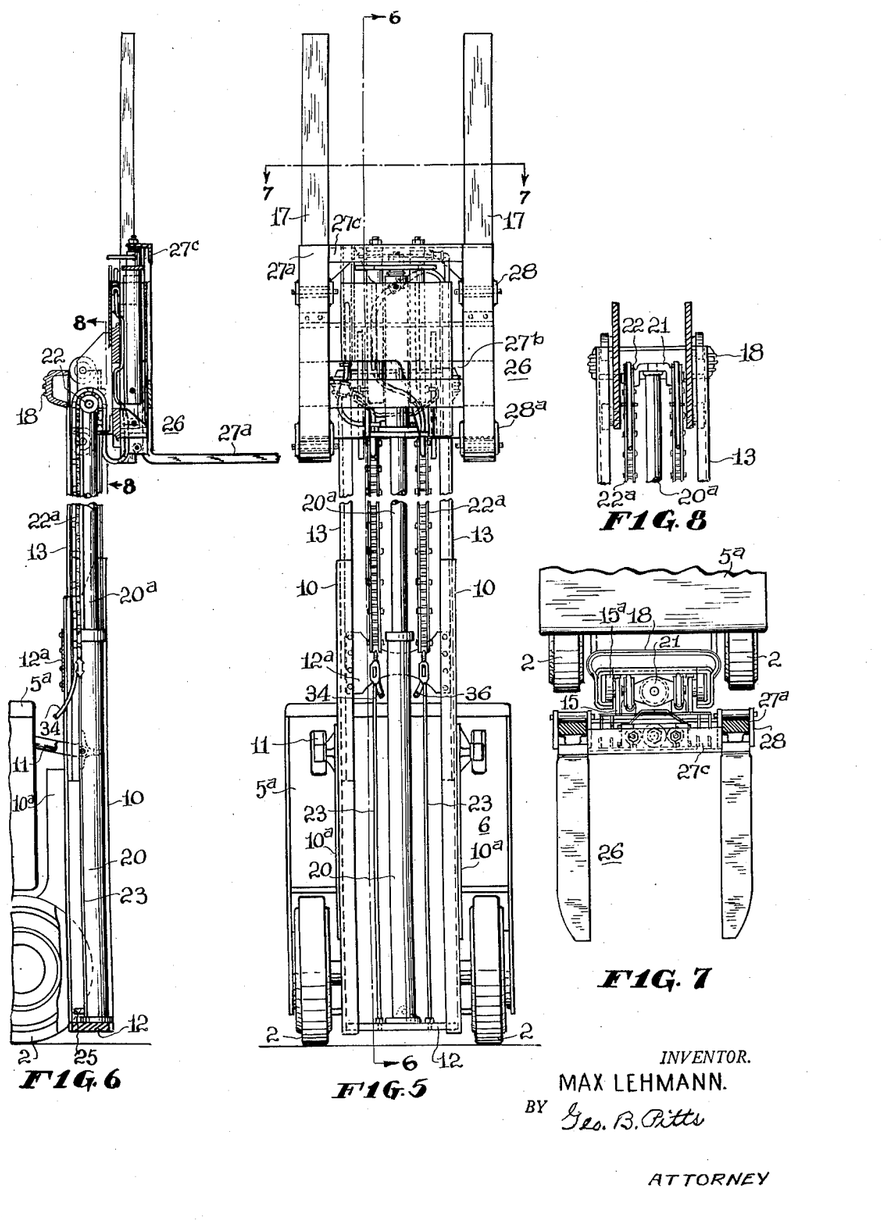
Fig. 5 is a front elevation of parts shown in Fig. 3.
Figs. 6 and 7 are sections on the lines 6—6 and 7—7, respectively, of Fig. 5.
Fig. 8 is a fragmentary section on the line 8—8 of Fig. 6.
Figure 9:
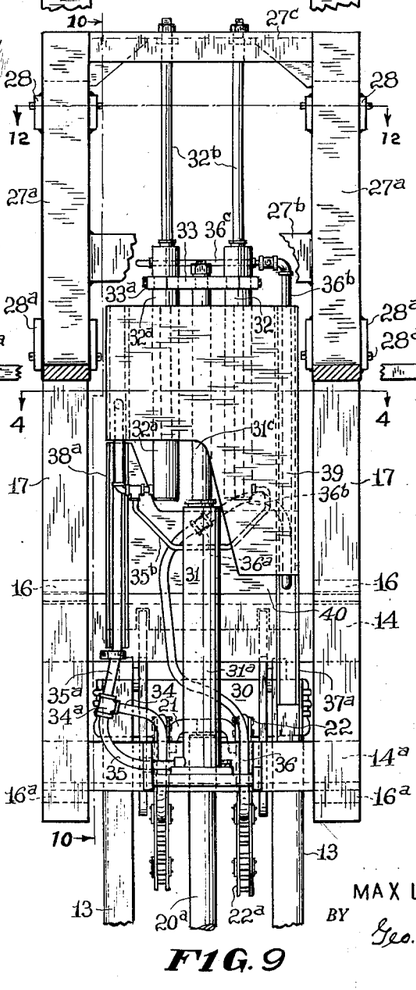
Fig. 9 is a fragmentary front elevation (similar to Fig. 5), enlarged, but showing the carrier in its uppermost position.
Figure 10:
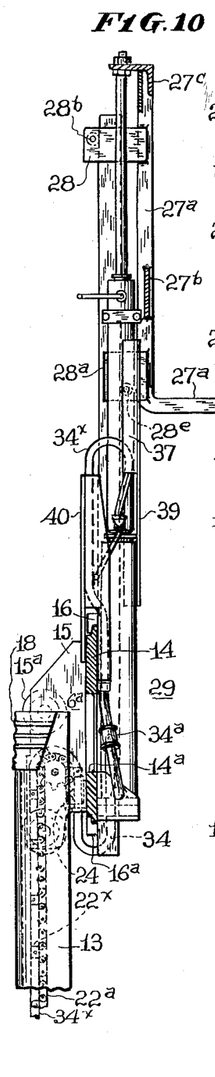
Fig. 10 is a section on the line 10—10 of Fig. 9.
Figure 11:
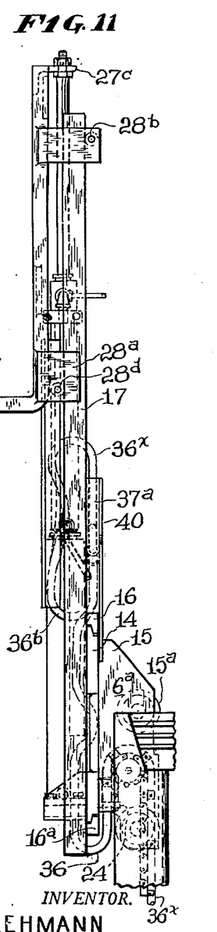
Fig. 11 is a fragmentary side elevation (parts being broken away) looking toward the left of Fig. 9.
Figure 12:
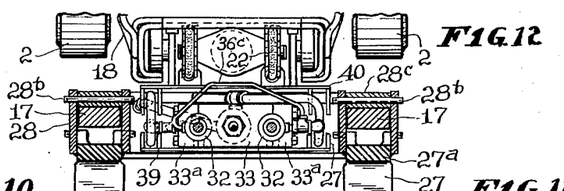
Fig. 12 is a section on the line 12—12 of Fig. 9.
Figure 13:
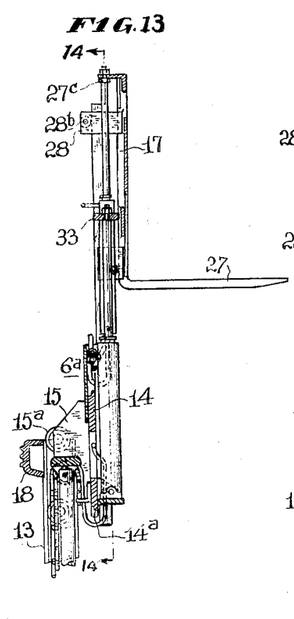
Fig. 13 is a section on the line 13—13 of Fig. 14.
Figures 14, 15:
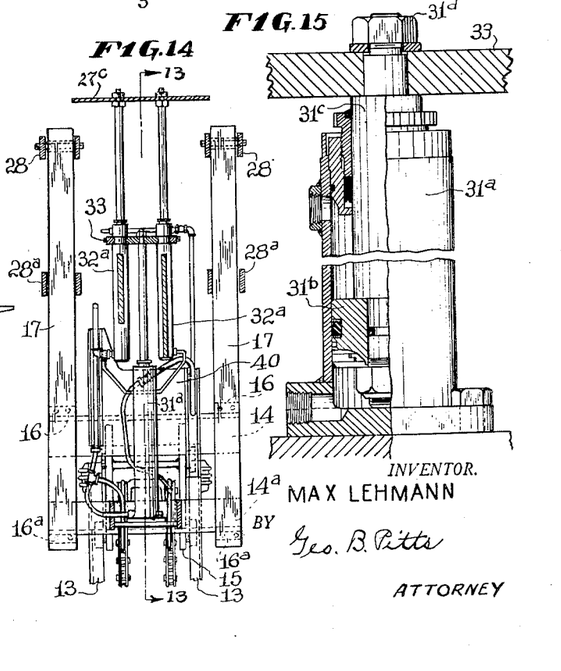
Fig. 14 is a section on the line 14—14 of Fig. 13.
Fig. 15 is a fragmentary section showing the main hydraulically operated cylinder (enlarged), parts being broken away.

Fig. 2 shows in dotted lines and Figs. 3, 5 and 6 show in full lines the load carrier 26 positioned at the lower ends of the auxiliary guides 17 but in an elevated position due to the raising of the elevating member 6a, whereas Fig. 2 shows in dotted lines and Figs. 9, 10 and 11 the elevating member 6a raised to the limit of its movement on the guides 13 and the carrier 26 raised to the limit of its movement on the auxiliary guides 17. It will be also understood that in either arrangement of piston areas to progressively operate the jacks 31 and 32, they operate in their downward movement in reverse relation to their movement upwardly.

From the foregoing description it will be apparent that the areas of the pistons in the jacks 31 and 32, 32, may be related to effect an initial movement of the load carrier by the jack 31 or the jacks 32, dependent of the load handling operations to be carried out.

In the present disclosure, as the areas of the pistons in the cylinders 32a are greater than the area of the piston in the cylinder 31a, it follows (I) that (a) in any position of the elevating member 6a and (b) with the carrier 26 at the lower ends of the guides 17, if fluid pressure is supplied to conduit 34, the applied pressure will operate the pistons in the cylinders 32a to raise the carrier 26 upwardly, such upward movement being limited by the length of the stroke of the pistons in the cylinders 32a at the position a (Figs. 1 and 2); (II) that upon movement of the carrier to position a, if the supply of fluid pressure through conduit 34 is continued the carrier 26 will be raised to a higher level, with respect to the elevating member 6a, such upward movement being limited by the length of the stroke of the piston 31b in the cylinder 31a, at the position b (Fig. 2); and (III) that by raising the elevated member 6a, the carrier 26 may be positioned at different levels, as well as levels above the guides 13 in their extended position, as shown in dotted lines in Fig. 2 and in full lines in Figs. 9, 10, 11, 13 and 14. In supplying fluid pressure through conduit 36 if the carrier 26 is at position b, it will first move to position a and thereafter move to the lower ends of the guides 17.

By reason of the movement of the elevating member 6a relative to the frame 1 and movement of the carrier 26 relative to the elevating member 6a, portions of the conduits 34, 36, as well as branch conduits 35a, 36b, consist of hose to permit flexing thereof (a) during movement of the carrier 26 relative to the elevating member and (b) during movement of the elevating member relative to the guides 10, 13. As shown in Figs. 4, 5, 6, 7, 8, 9, 10, 11, 12, 13 and 14, portions 34x, 35x, of the conduits 34, 36, respectively, are formed of hose and extend endwise of and move with the chains 22a, being supported thereon between spaced lugs or wings 22x on certain links of the chains and held against detachment or bulging by clips or sections of wire, this form of construction being substantially similar to the form of construction shown in my co-pending application filed December 9, 1947, Ser. No. 790,571. The hose portions forming the branch conduits 35a, 36b, are positioned in and extend endwise of pairs of opposed channels 37, 37a, and 38, 38a. The channels 37, 38, are provided by spaced, vertically disposed elongated strips welded on and extending inwardly from a plate 39, which in turn is welded to the cylinders 32a; whereas the channels 37a, 38a, are provided by spaced, vertically disposed elongated strips extending inwardly from a plate 40, which is welded to the cross member 14 (see Figs. 10 and 11).

Figures 16, 19, 22:
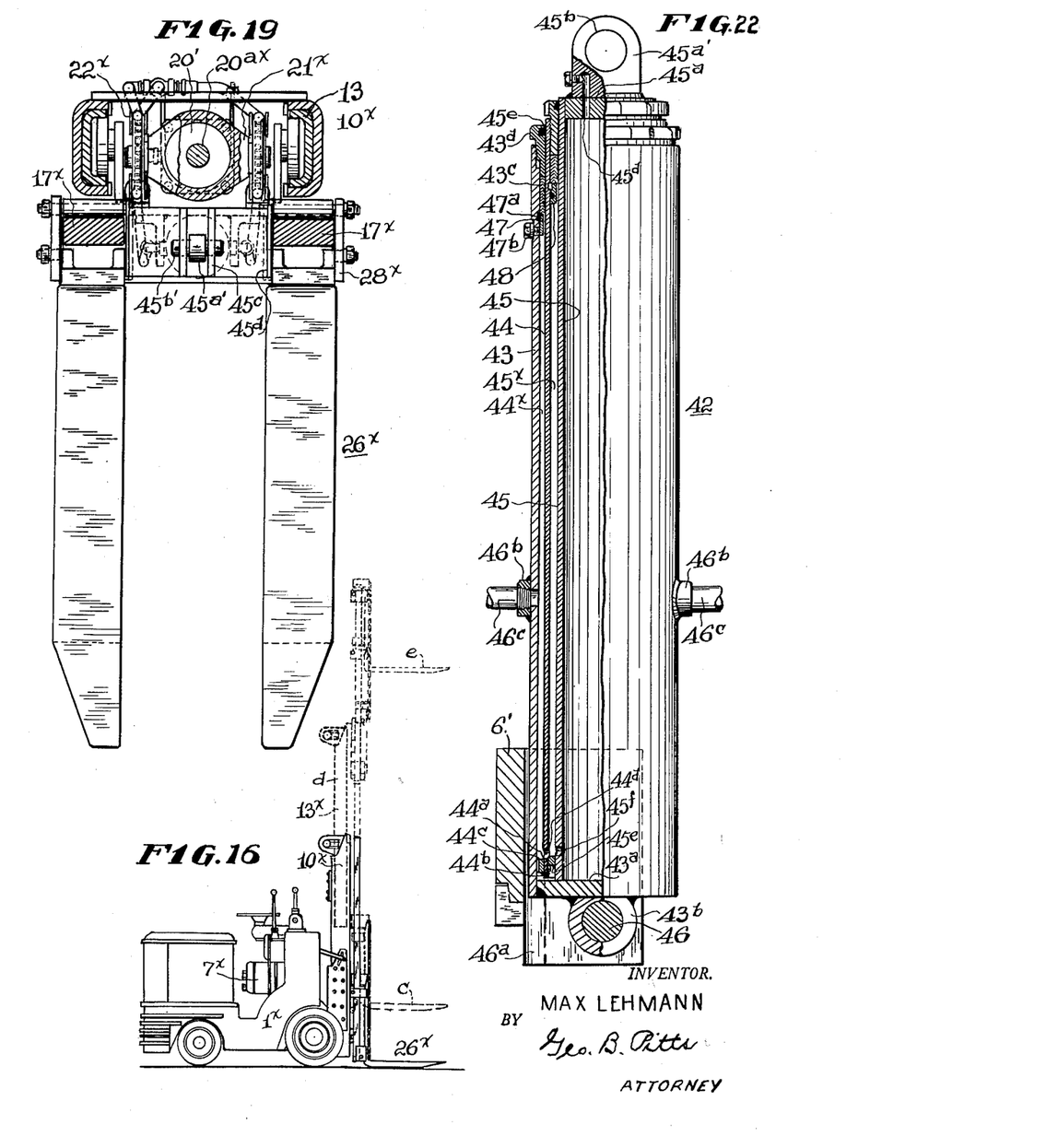
Fig. 16 is a view similar to Fig. 1 but illustrating a truck embodying a modified form of construction.
Fig. 19 is a section on the line 19—19 of Fig. 18.
Fig. 22 is a detail view of the hydraulically operated mechanism, parts being broken away.
Figure 17:
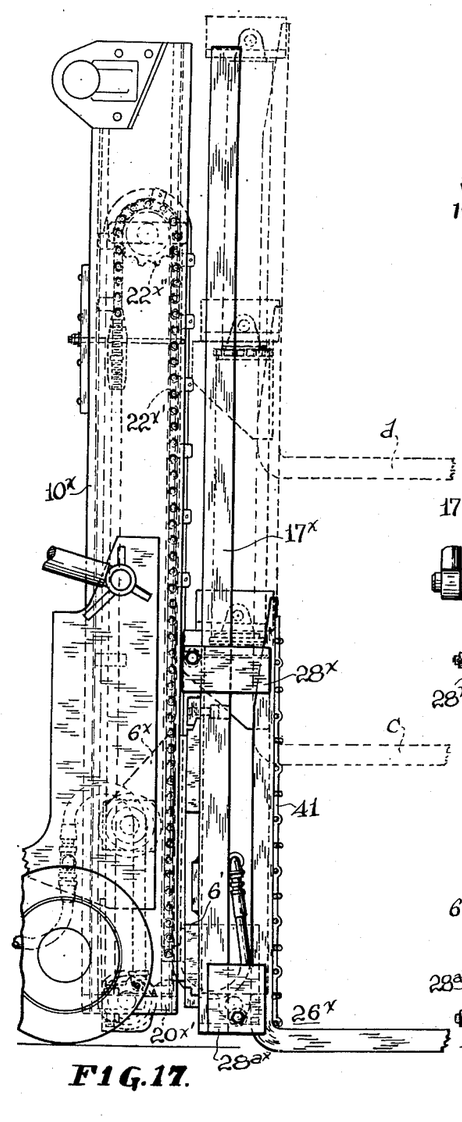
Fig. 17 is a fragmentary side elevation of parts shown in Fig. 16, the elevating member and carrier being enlarged and positioned in their lowermost position.
Figures 20, 21:
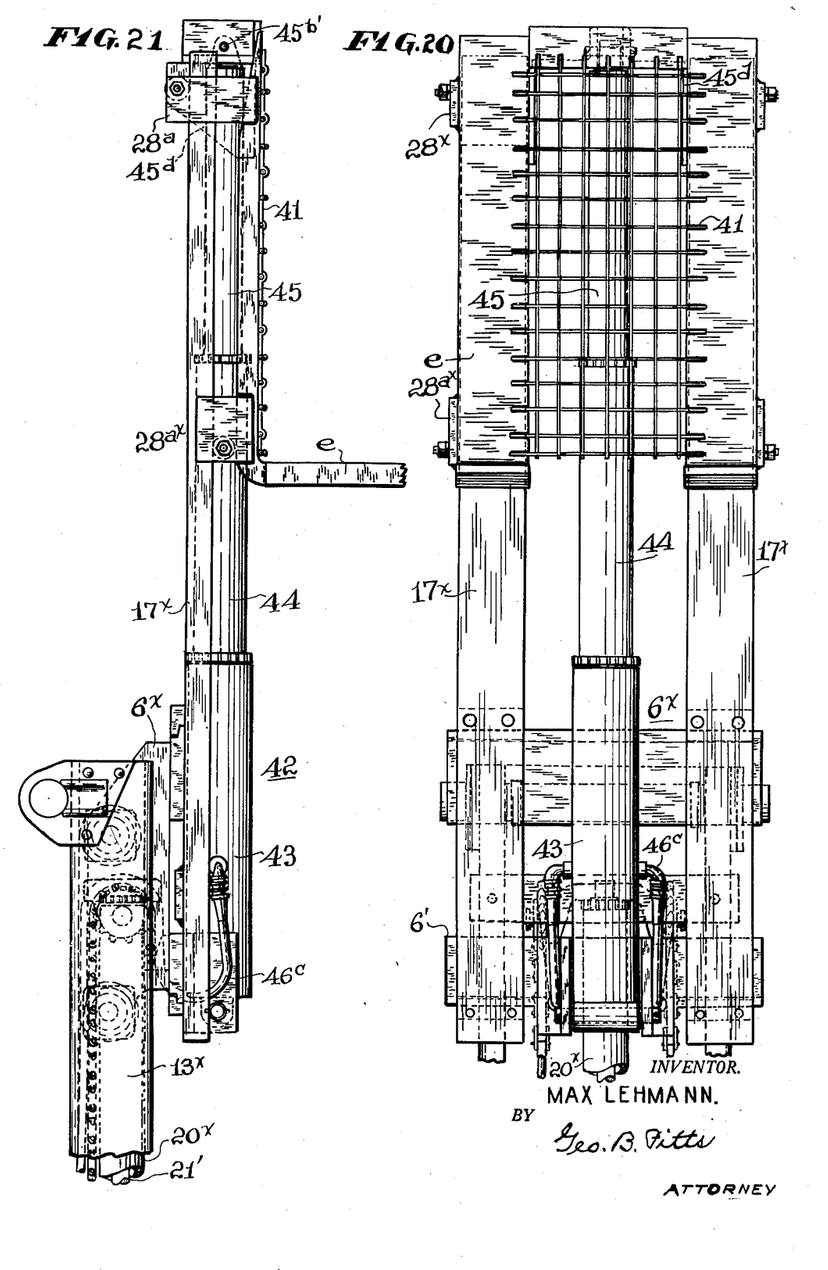
Fig. 20 is a fragmentary front elevation showing the carrier elevated to its uppermost position.
Fig. 21 is a side elevation of parts shown in Fig. 20.

Figs. 16 to 22, inclusive, illustrate a different embodiment of the invention in that the supply of fluid under pressure is interconnected to the power mechanisms for raising the elevating member indicated at 6x and load carrier indicated at 26x and the lifting capacity of the cylinders thereof are so related (a) that by the supply of the fluid the carrier will be raised from its low or normal position to and from a selected level as shown in dotted lines at c in Fig. 17 (or to and from any intermediate level) independently of and without raising the elevating member, such operation being controlled by the valve; (b) that if, upon raising the carrier to the level c, the valve is maintained open to continue the supply of fluid pressure, the carrier 26x will be raised to the level as shown in dotted lines at d (Fig. 17) independently of and without raising the elevating member 6x, further upward movement of the carrier along the guides 17x being limited by the stroke of a piston or a stop to be later referred to; and (c) that by reason of the limited movement referred to, if the valve is maintained open to continue the supply of fluid pressure, such pressure will be applied to the power mechanism for raising the elevating member to raise the latter, the effect of which is to raise the elevated carrier 26x to a higher level such as shown in dotted lines at e in Fig. 16 and in full lines in Figs. 20 and 21, the upward limit to which the carrier may be raised, such limit being dependent on the length of the guides 17x and the heighth to which the guides for the elevating member may be extended, as shown in Figs. 20 and 21.

Referring to Figs. 16 to 23, inclusive, the truck frame is indicated at 1x and supports spaced guides 10x in which are mounted extensible guides 13x, for the elevating member 6x. The elevating member 6x supports a pair of auxiliary guides 17x. The carrier 26x is provided with upper and lower shoes 28x, 28a×, which slidably engage the guides 17x. The power mechanism for raising the elevating member 6x consists of the following: 20x indicates a vertically disposed cylinder mounted on a base 20x' secured to the lower ends of the guides 10x and provided with a piston 20' connected to a rod 20a×. The lower end of the cylinder 20x is provided with a fluid supply 20z (see Fig. 23) leading from the source of supply. 20b indicates a bleeder for the cylinder 20x leading from its upper end to the reservoir R for the fluid (Fig. 23). The upper end of the rod 20a× is provided with a head 21x the opposite ends of which are provided with sprockets 22x'' for chains 22x' which are connected to the elevating member 6x; the chains 22x' support the flexible portions of the conduits forming part of the fluid system later referred to, such portions serving to maintain the fluid supply connections to the power mechanism for raising the carrier. The parts referred to are similar in construction and operation to like parts shown in Figs. 1 to 14, inclusive, except that the supply of fluid under pressure to operate the piston 20' in the cylinder 20x is dependent on the initial movement of the carrier to a predetermined level, as already set forth.

41 indicates a guard secured to the upstanding members of the carrier 26x, to prevent loads on the latter engaging with the mechanism (later referred to) rearward of the carrier, with resulting damage to the mechanism or loads or to both thereof. The guard 41 is shown as consisting of a series of spaced vertical rods and a series of spaced horizontal rods welded to the vertical rods, the opposite ends of horizontal rods being extended into overlapping relation to the upstanding members of the carrier and welded thereto.

Figure 18:
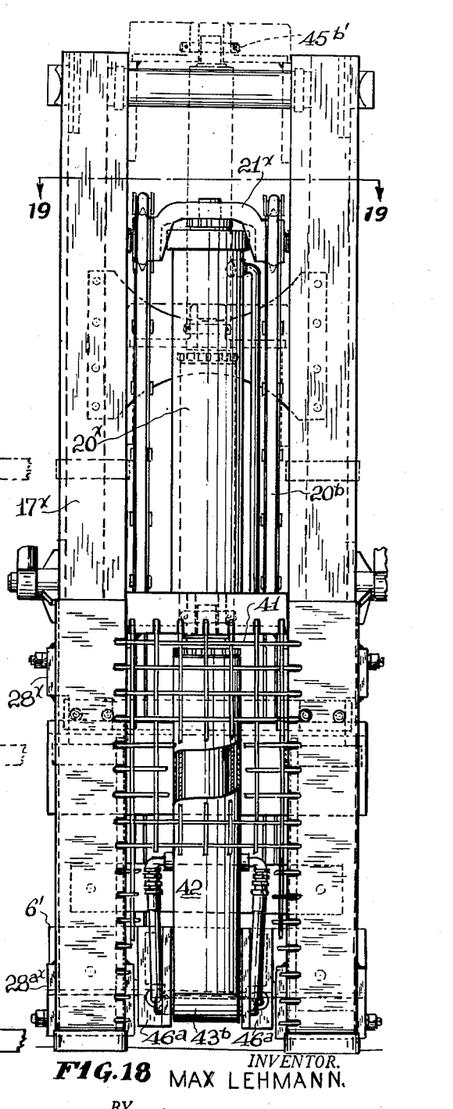
Fig. 18 is a front elevation of parts shown in Fig. 17.

The power mechanism for raising the carrier 26x on the guides 17x relative to the elevating member 6x is indicated as an entirety at 42 and consists of a cylinder 43 mounted on the elevating member 6x and hollow pistons 44, 45, therewithin, concentric to each other and the cylinder 43 when the pistons are in normal position (see Fig. 22) and the carrier 26x is at its lowered position, as shown in Figs. 17 and 18. The cylinder 43 and pistons 44, 45, have predetermined diameters to provide spaces 44x, 45x, therebetween. By preference the outside diameters of the cylinder 43 and pistons 44, 45, are 4¾ inches, 3¾ inches and 2¾ inches, respectively; the spacing between the cylinder 43 and piston 44 is approximately $\frac{5}{16}$ inch and the spacing between the pistons 44, 45, is approximately 4/16 inch. The cylinder 43 is closed at its lower end by a head 43a to which is welded a transversely disposed hollow member 43b. 46 indicates a bar extending through the member 43b and supported at its opposite ends in vertically disposed angles 46a welded at their inner ends to and extending outwardly from the lower cross bar 6' of the elevating member 6x. The upper end of the piston 45 is closed by a head 45a to which is welded an upwardly extending wall 45a' formed with a transverse opening 45b. A pin 45b' extends through the opening 45b, its opposite ends being supported in the upstanding legs of angles 45c. The bases of the angles 45c are welded at their outer ends to webs 45d, which in turn are welded to the upstanding members of the carrier 26x. A bleeder duct 45d' extends through the head 45a and wall 45a', its outer end being closed by a plug.

In the arrangement set forth it will be observed that the power mechanism 42 is interposed between the elevating member 6x and the carrier 26x (that is, the outer element of the mechanism 42—cylinder 43—is connected to the elevating member and the inner element of the mechanism—piston 45—is connected to the carrier), so that the operation of the pistons relative to the cylinder 43 results in vertical movement of the carrier with respect to the elevating member.

The upper end of the cylinder 43 is provided with a suitable gland 43c, which includes a ring 43d exteriorly screw threaded to engage threads on the open end of the cylinder 43, the ring providing a spacer between the cylinder 43 and the piston 44. The inner wall of the ring 43d is formed with an annular recess in which is seated a wiper 43e for engaging the outer wall of the piston 44. As shown in Fig. 22, sealing and spacing elements similar to those at the upper end of the cylinder 43 are provided between the upper end of the piston 44 and the piston 45. The cylinder 43 is formed intermediate its ends with an opening in registry with an interiorly threaded ring 46b to which a fluid supply and discharge pipe 46c is connected. By preference I provide fluid supply and discharge connections at diametrical opposite sides of the cylinder 43 to insure an adequate supply of fluid under pressure thereto. As later apparent, the fluid (preferably oil) under pressure is supplied from its source, when is preferably similar to that already set forth by operation of a suitable valve V, in the manner hereinafter set forth. The lower end of the piston 44 is open for a purpose later apparent. The outer walls of the pistons 44, 45, inwardly of their lower ends are provided with rings 44a, 45e', respectively, and the wall of the piston 44 below the ring 44a is formed with one or more slots 44b (one only being shown). The ring 45e' slidably fits the inner wall of the piston 44 and the ring 44a slidably fits the inner wall of the cylinder 43, except that at spaced points circumferentially the outer side wall of the ring 45a is formed with vertically disposed slots or grooves 44c, so that the fluid may flow therethrough and through the slots 44b, whereby the pressure of the supplied fluid may be applied to the rings 44a, 45e', to force the pistons 44, 45, upwardly to raise the carrier 26x to the position c (Figs. 17 and 18). As shown, the walls of the pistons 44, 45, in a plane above the rings 44a, 45e', are formed with openings 44d, 45f, respectively, which permit the space 45x and piston 45 to be initially filled with oil. 47 indicates a stop mounted on the inner wall of the cylinder 43 below but adjacent to the gland 43c. The stop 47 is suitably fixed at its upper end to a lug 47a seated in a recess in the cylinder wall; the inner side of the stop at its lower end is formed with a recess into which extends the inner end of a bolt 47b threaded in an opening formed in the cylinder wall. 48 indicates a stop mounted on the inner wall of the piston 44 below but adjacent to the gland for the piston 44. The purpose of the stops 47, 48, will be later set forth.

*Operation.*—Referring to Fig. 23 (assuming the elevating member 6x and load carrier 26x to be at normal or floor loading or discharge position), R indicates the reservoir for the liquid, such as oil, connected by pipe r with the intake of pump P, which is driven by motor 7x (Fig. 16). The outlet of pump P is connected by pipe p with valve V from which the fluid supply and discharge connections 46c lead to cylinders 20x, 43. If handle of valve V is moved to position v, fluid pressure will be supplied to the cylinders 20x, 43, but due to the pressure ratio between the piston 20' and pistons 44 and 45, pistons 44, 45, will be raised as a unit to raise the carrier 26x, relative to the elevating member 6x, to any desired level below the stop 47 or to level c (Fig. 17), the level at which ring 44a engages the stop 47. If, at either of these levels, the handle is returned to its neutral position the pistons 44, 45, will remain at rest and support the carrier in its elevated position; and if the handle is moved to position v' the pistons 44, 45, and carrier 26x will gravitate downwardly. In the downward movement of the carrier 26x, fluid in the pistons 44, 45, will flow through the connections 46c to valve V and from the latter through pipe 49 to the reservoir R. Accordingly, handling of loads to and from levels c or therebelow may take place as above set forth.

If the handle of valve V is maintained at position v following the engagement of ring 44a with the stop 47, then piston 44 operates as a cylinder and piston 45 will be raised, relative to the cylinder 43, piston 44 and elevating member 6x, to raise the carrier 26x to any desired level above stop 47 but below the stop 48 or to level d (Fig. 17), the level at which the ring 45e' engages stop 48. Accordingly, by operating the valve handle to neutral or reverse position, the carrier 26x may be held at either of these levels or allowed to gravitate to any lower level and to normal position; the pistons 44, 45, in such downward movement of the carrier will move reversely to their movement upwardly and the oil supplied thereto will flow back to reservoir R as already set forth.

If the valve handle is maintained at position v following the engagement of ring 45e' with the stop 48, the supplied pressure will operate piston 20' in cylinder 20x to raise the elevating member 6x on the guides to any desired level below the upper ends of the guides 13x or to the level limited by the upper ends of the guides 13x when the latter are fully extended, as shown in dotted lines in Fig. 16. As the carrier 26x has been raised to position d on the guide 17x, such upward movement of the elevating member will raise the carrier 26x to a level above d equal to the heighth to which the elevating member is raised; thus, if the elevating member 6x is raised to its highest level (see Figs. 20 and 21), the carrier 26x will be raised to position e. As a result, loading, stacking and removal operations may be effected at level e as shown in Figs. 13, 16, 20 and 21 or any selected level therebelow.

From the foregoing description it will be observed that provision is made for handling loads to and from levels above that determined by the heighth of the guides irrespective of the length thereof when the inner guides are extended to the limit of their relative endwise movement. It is obvious that such operation of the carrier would follow even if the length of the guides was increased by employing additional extensible guides for the elevating member.

It will be noted that in some instances, in plant operations, overhead conditions make it necessary to equip the truck with guides (the main guides and extensible guides) of a length to meet these conditions. However, since the form of construction disclosed provides for raising the carrier to levels above the limitation imposed by the guides, the truck is nevertheless advantageously operable under the conditions referred to.

In the form of construction shown in Figs. 1 to 15, inclusive, the supply of fluid under pressure to the cylinder 20 and its discharge therefrom is controlled by one valve and the supply of fluid under pressure to the cylinders 31a, 32a, and its discharge therefrom is controlled by a separate valve. These valves are of well known construction and therefore are not illustrated. It will thus be noted that by this arrangement, the elevating member 6a and carrier 26 are respectively movable in either direction independently and accordingly (a) with the guides 13 in normal position the carrier 26 may be raised to an elevation thereabove and (b) with guides 13 extended to varying heighths, due to raising of the elevating member 6a, the carrier 26 may be raised to levels above the upper ends of the guides 13.

In the form of construction shown in Figs. 16 to 23, inclusive, as the fluid under pressure is supplied by operation of a single valve to the cylinders 20x, 43, and the areas of the pistons therein have a predetermined relation, the carrier 26x is initially raised a distance determined by the strokes of the pistons 44, 45, and thereafter the elevating member is raised, the effect of which is to raise the carrier, its guides and the elevating member 6x as a unit, to position the carrier at a level above the guides 13x for the elevating member in their extended position. While the power mechanisms in the disclosed forms of construction are controlled in a different manner, (a) the uppermost operating level for the carrier is obtained by positioning it at the upper ends of its guides and positioning the elevating member at the upper end of its guides when the latter are in extended position and (b) the carrier may be operated to and from its uppermost level or selected levels therebelow.

To those skilled in the art to which my invention relates, many changes in construction and widely differing embodiments and applications of the invention will suggest themselves without departing from the spirit and scope of the invention. My disclosures and the description herein are purely illustrative and are not intended to be in any sense limiting.

What I claim is:

1. In an industrial truck, the combination with a wheel supported frame and vertically disposed guides thereon, of an elevating member movable endwise of said guides, a vertically disposed auxiliary guide mounted on and movable with said elevating member, a load carrier slidably mounted on said auxiliary guide, a source of fluid supply under pressure, fluid operated mechanisms for operating said carrier endwise of said auxiliary guide and for operating said elevating member upwardly, and valve controlled connections between said source of supply and said mechanisms.

2. In an industrial truck, the combination with a wheel supported frame and vertically disposed guides thereon, of an elevating member movable endwise of said guides, a vertically disposed auxiliary guide supported at its lower end on said elevating member, a load carrier slidably mounted on said auxiliary guide, a source of fluid supply under pressure, fluid operated mechanisms having different size pressure areas and arranged to initially operate said carrier on said auxiliary guide relative to said elevating member a predetermined distance and thereafter operate said elevating member, and a valve controlled connection leading from said source of supply and connected to said mechanisms.

3. In an industrial truck, the combination with a wheel supported frame and vertically disposed guides thereon, of a load carrier, and means for raising the carrier to levels above the upper ends of said guides, said means consisting of a member movably supported on said guides for movement substantially from end to end thereof, an auxiliary guide on said member and extending upwardly therefrom, shoes on said carrier for slidably supporting it on said auxiliary guide, and mechanisms for moving said carrier along said auxiliary guide and said member along said first mentioned guides.

4. A truck as claimed in claim 3 wherein said mechanisms consist of fluid operated cylinder-piston devices on said frame and operatively connected to said movable member, cylinder-piston elements on said member, one of said last mentioned elements being connected to said carrier, and a valve controlled fluid pressure supply connected to said cylinders.

5. In an industrial truck, the combination with a wheel supported frame, of vertically disposed guide means thereon, a support movable endwise of said guide means and provided with vertically disposed auxiliary guide means extending upwardly therefrom, a load carrier slidably mounted on said auxiliary guide means, a source of fluid supply under pressure, separate fluid operated cylinder-piston elements having different displacements for raising said support and said carrier, one in advance of the other, a conduit leading from said source of fluid supply under pressure and provided at its outer end with connections to said cylinders, and valve means in said conduit for controlling the fluid supply to said cylinders.

6. In an industrial truck, the combination with a wheel supported frame and vertically disposed guides thereon, of an elevating member movable endwise of said guides, a vertically disposed auxiliary guide supported at its lower end on said elevating member, a load carrier slidably mounted on said auxiliary guide, a fluid operated mechanism between said frame and said elevating member for raising the latter and consisting of a cylinder and a piston therein, a fluid operated mechanism between said elevating member and said carrier for raising the latter and consisting of a cylinder and a piston therein, the piston in said last mentioned mechanism having an area greater than the area of the piston in said first mentioned mechanism, a source of supply of fluid under pressure having a connection for and common to the lower ends of said cylinders, and a valve mechanism for controlling the flow of the fluid through said connection.

7. In an industrial truck, the combination with a wheel supported frame and vertically disposed guides thereon, of an elevating member movable endwise of said guides, power operated means for raising said elevating member, an auxiliary guide on and extending upwardly from said elevating member, a load carrier slidably mounted on said auxiliary guide, and power operated mechanism for raising said carrier on said auxiliary guide relative to and independently of said elevating member.

8. A truck as claimed in claim 7 wherein said power operated mechanism for raising said carrier consists of cylinder-piston elements mounted between said elevating member and said carrier, a source of fluid supply under pressure and valve controlled connections between said source of supply and said cylinder.

9. In an industrial truck, the combination with a wheel supported frame, vertically disposed main guides thereon and separate guides slidably mounted on said main guides, of an elevating member movable endwise of said separate guides, cylinder-piston elements between said frame and said elevating member for raising the latter, an auxiliary guide on and extending upwardly from said elevating member, a load carrier slidably mounted on said auxiliary guide, cylinder-piston elements mounted between said elevating member and said carrier, one of said last mentioned elements being connected to said carrier and arranged to raise the latter on said auxiliary guide relative to and independently of said elevating member, a source of fluid supply under pressure and a valve controlled conduit leading from said source of supply and having at its outer end connections with said cylinders and arranged to initially move said carrier a predetermined distance along said auxiliary guide independently of said main and separate guides and thereafter raise said elevating member, separate guides, auxiliary guide and carrier.

10. A truck as claimed in claim 7 wherein said power operated mechanism for raising said carrier consists of a cylinder mounted on said elevating member, a reciprocatable piston in said cylinder connected to a rod for operating it, a separate cylinder connected to and operated by said rod, a reciprocatable piston in said separate cylinder and connected to a rod for operating it, said last mentioned rod being connected to said carrier, a source of fluid supply under pressure and valve controlled connections between said source of supply and the lower ends of said cylinders.

11. A truck as claimed in claim 7 wherein said power operated mechanism for raising said carrier comprises relatively movable main and separate pairs of elements, each pair consisting of a cylinder and a reciprocatable piston, one of which elements of said main pair being mounted on said elevating member and its other element being connected to and supporting one element of said separate pair of elements, the other element of said separate pair of elements being connected to said carrier, a source of fluid supply under pressure, connections from said source of supply to the lower ends of said cylinders and to the upper ends of said cylinders and valve means for controlling the supply to said cylinders at corresponding ends thereof and discharge from their opposite ends to move said pistons in either direction.

12. A truck as claimed in claim 3 wherein said guides consist of a pair of main uprights and secondary uprights slidably engaging said main uprights, said movable member is slidably mounted on said secondary uprights and said mechanism consists of fluid operated cylinder-piston devices on said frame and connected to said movable member, separate cylinder-piston devices on said member and connected to said carrier, a source of fluid supply under pressure, valve controlled connections from said source of fluid supply to said first mentioned devices, and valve controlled connections from said source of fluid supply to said separate devices.

13. In an industrial truck, the combination with a wheel supported frame and vertically disposed guides thereon, of an elevating member movable endwise of said guides, a vertically disposed auxiliary guide mounted on and movable with said elevating member, a load carrier slidably mounted on said auxiliary guide, a source of fluid supply under pressure, a fluid operated mechanism for operating said elevating member and consisting of cylinder-piston elements between said frame and said elevating member, a fluid operated mechanism for operating said carrier relative to said member and consisting of a cylinder mounted on said elevating member, a hollow piston within and slidable endwise of said cylinder and operatively connected to said carrier, said cylinder and piston being filled with fluid and a stop on the inner wall of said cylinder for limiting the endwise movement of said piston and a valve controlled connection leading from said source of supply to said cylinders, the operation of the valve in said connection serving to supply fluid under pressure therethrough to operate said piston into engagement with said stop and to thereafter supply fluid under pressure to said first mentioned cylinder to operate said elevating member.

14. In an industrial truck, the combination with a wheel mounted frame and substantially vertical guides thereon, of a load carrier and mechanism for raising said load carrier in a direction parallel to said guides to levels above the uppermost ends thereof, said mechanism consisting of a support movable on said guides, a guide for said carrier mounted on said support and disposed parallel to said guides, power operated elements between said frame and said support, power operated elements between said support and said load carrier, and separate means for operating said respective power elements.

15. A truck as claimed in claim 14 wherein the power elements between said support and said load carrier comprise a pair of relatively movable members, one of which is supported on said support, a separate pair of relatively movable members one of which is connected to said load carrier, the other members of said pairs of members being connected together, each pair of members consisting of a cylinder and a piston reciprocatable therein, said pistons having different displacements, whereby the movable member of that pair of elements wherein said piston having the larger displacement constitutes one of said elements is moved a predetermined distance relative to and in advance of the other pair of members, and a source of fluid supply under pressure connected to said cylinders.

16. In an industrial truck, the combination of a wheel mounted frame and vertically disposed guides thereon, of a support slidable on said guides, an auxiliary guide on said support, cylinder-piston elements between said frame and said support, a load carrier slidable on said auxiliary guide, cylinder-piston elements between said support said last mentioned piston element having an area greater than that of the first mentioned piston element, a source of fluid supply under pressure, a connection from said source of supply of fluid under pressure to said cylinders, and a valve for controlling the flow of fluid through said connection, whereby said load carrier is initially moved upwardly on said auxiliary guide a distance dependent on the length of the stroke of the adjacent piston element relative to said support and thereafter said support is moved upwardly on said guides a distance dependent on the length of the stroke of the adjacent piston element.

17. In an industrial truck having vertically disposed guides and a power operated support slidably mounted on said guides and means for raising said support, of a vertically disposed guide member on said support, a load carrier slidably mounted on said guide member, a source of fluid supply under pressure, a fluid operated mechanism between said support and said carrier for raising the latter, said fluid operated mechanism consisting of vertically disposed cylinder-piston elements mounted on said support and a vertically disposed cylinder connected to and adapted to be raised by said piston and provided with a reciprocatable piston connected to said carrier, said cylinders being connected at their lower ends with a source of fluid supply and one of said pistons having an area greater than the other piston, whereby the carrier is progressively raised predetermined distances, and valve means for controlling the fluid supply to said cylinders.

18. In an industrial truck, the combination with a frame having vertical guides mounted thereon and separate guides movable endwise of said first mentioned guides to a predetermined level above the latter, of a load carrier, and a combined supporting and operating mechanism for positioning said carrier at a low level adjacent the flooring and at levels thereabove, said mechanism consisting of an elevating member mounted on and movable endwise of said movable guides, auxiliary guides for slidably supporting said carrier, mounted on and extending upwardly from said elevating member, and hydraulic means for raising said carrier, elevating member and movable guides, said means including a cylinder on said frame, a piston in said cylinder connected to a rod carrying a reeving element and a flexible member engaging said element and anchored at its inner end on said frame and connected at its outer end to said elevating member, devices between said elevating member and said movable guides arranged to inter-engage during upward movement of said member to a predetermined level for raising said movable guides, hydraulic cylinder-piston elements between and connected respectively to said elevating member and said carrier for moving the latter relative to said auxiliary guides and valve means for controlling the supply of liquid pressure to said cylinders.

19. A truck as claimed in claim 18 wherein the displacement of said last mentioned piston is greater than that of said first mentioned cylinder.

MAX LEHMANN.

REFERENCES CITED

The following references are of record in the file of this patent:

UNITED STATES PATENTS

| Number | Name | Date |
|---|---|---|
| 2,399,632 | Guerin | May 7, 1946 |
| 2,432,411 | Guerin et al. | Dec. 9, 1947 |